Figure 1:
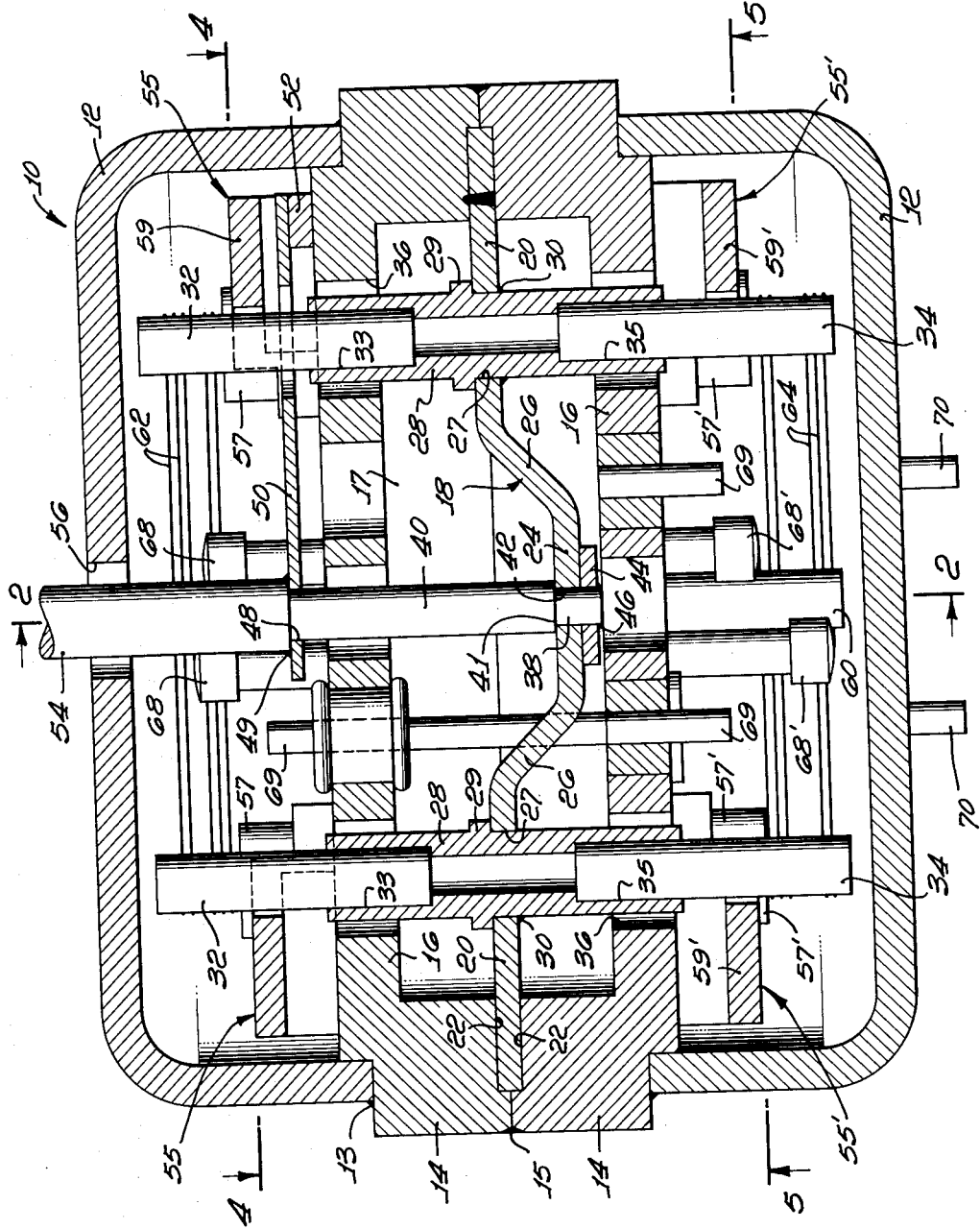

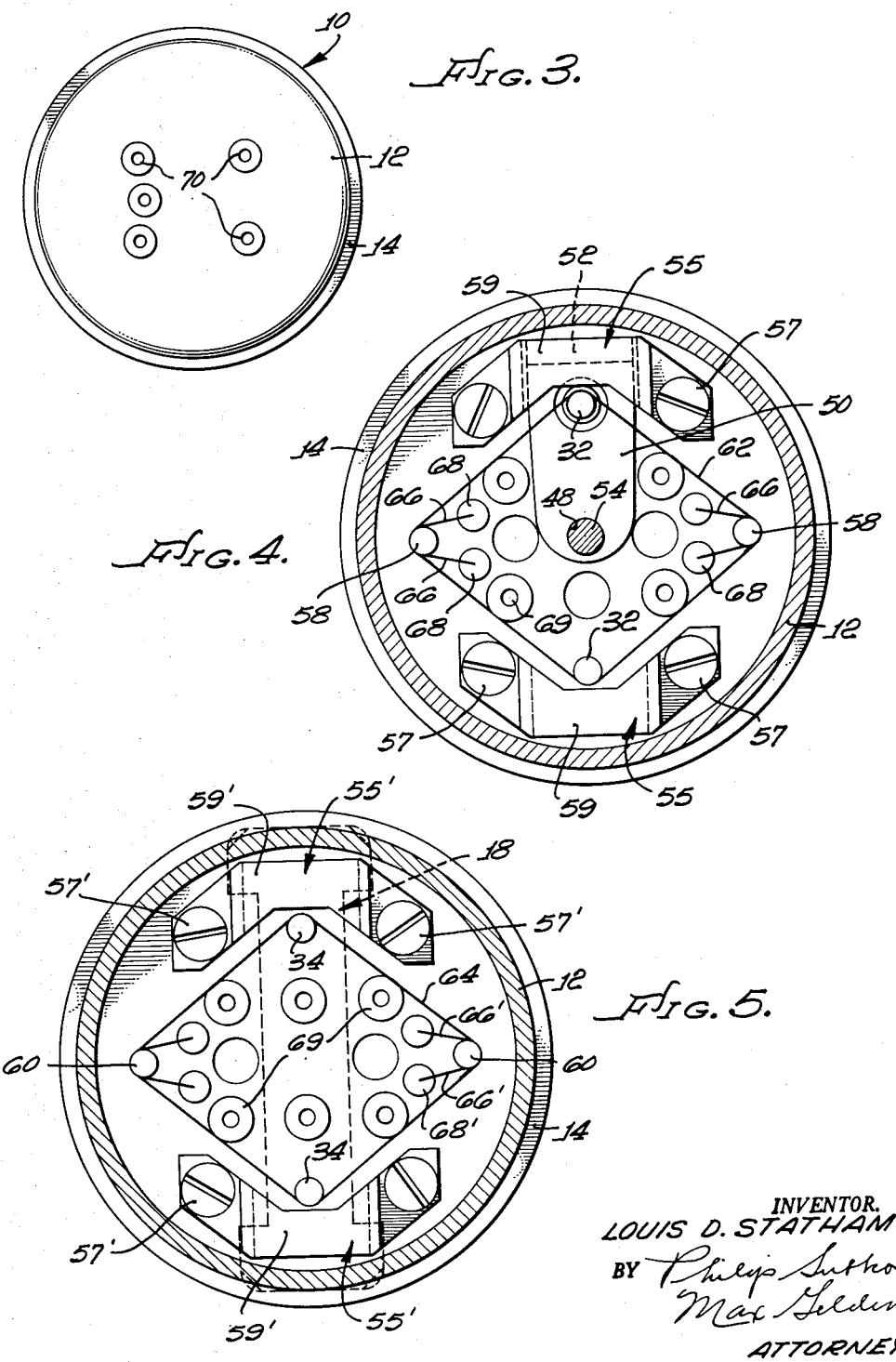

United States Patent Office 2,994,052
Patented July 25, 1961

2,994,052
TRANSDUCER
Louis D. Statham, Beverly Hills, Calif., assignor to Statham Instruments, Inc., Los Angeles, Calif., a corporation of California
Filed Dec. 14, 1959, Ser. No. 859,376
5 Claims. (Cl. 338—2)

This invention relates to improvements in transducers, particularly for measuring physical parameters such as pressure, acceleration and displacement, in which unbonded electrical resistance strain wire gages are employed.

In the well known form of strain wire transducer, the strain wire which comprises the sensing element is mounted on pins which are movable relative to each other, at least one of the pins being positioned on a movable member. A force summing member is provided to which the parameter to be measured is applied, e.g. force or displacement, and means is provided to translate the motion of said force summing means due to said force or displacement, to a relative motion between said pins. This causes a change in tension of the strain wire and a corresponding change in resistance thereof proportional to the applied force or displacement being measured. The strain wire is connected in a measuring device such as an electrical circuit in the form of a Wheatstone bridge for measuring this change in resistance.

In a known form of strain wire transducer, the strain wires are mounted on pins all of which are positioned on a flexible structure, and a connection is provided whereby the force or displacement to be measured is transmitted from the force summing means to the flexible structure so as to cause said structure to flex or bend as a result of such force or displacement. Such flexing of the flexible structure causes the pins to pivot toward or away from each other, changing the linear distance between the pins, i.e., reducing or increasing such distance, and the tension and resistance of the strain wires is made to vary accordingly.

It is an object of the invention to design a strain wire transducer of simplified structure, of the type wherein only certain of the wire mounting pins are positioned on the flexible member, for pivotal motion of said pins in response to deflection of said member.

Another object is to provide a transducer of the foregoing type and including simple means affording overload protection for the strain wires.

Still another object is the provision of a transducer of the foregoing types wherein terminal leads connected to the ends of the strain wires are taken off a fixed rather than a movable pin.

Other objects and advantages will be apparent from the following description of the invention.

The transducer of this invention comprises a frame, across which is mounted a single flexure formed from a strip of sheet material of width substantially greater than its thickness forming a flexible beam herein referred to as a flexure member. Such member has a central offset portion and angularly positioned or inclined members connecting said central portion to outwardly extending arms. The outwardly extending arms of the flexure member are coplanar, and the central portion is in a plane parallel to the plane of the flexible arms and displaced therefrom, the angularly displaced central section forming an obtuse angle with each of the coplanar portions. A force summing member, e.g. a rod, is mounted axially of the flexure member and is connected to the central portion of the flexure member for displacement or flexing thereof in response to a force or displacement applied to the force summing member. This flexible structure provides a system which can be displaced or flexed by an axial movement of the force summing member, but which is relatively rigid against a twisting or lateral motion of the force summing member.

Wire mountings or insulated pins are connected near the opposite ends of the outwardly extending flexible arms of the flexure member, and extend perpendicular to the plane of such arms, so that on displacement or flexing of the flexure member in response to a motion of the force summing member, these pins pivot outwardly away from each other, or toward each other. The ends of the outwardly extending portions or arms are fixedly connected to the frame. Fixed wire mountings or pins are mounted on the frame between the pins on the flexure member, such fixed pins being aligned midway between the pivotally mounted pins. An electrical resistance strain wire is stretched in tension between the pins on the flexure member and the fixed pins on the frame, the strain wire being in a plane parallel to the plane of the outwardly extending flexible arms of said flexure member.

When the pins on the flexible arms are pivoted as a result of flexing of the flexure member, the linear distance between the ends of the pins on the flexible arms and the fixed pins changes, producing a change in tension of the strain wire and a change in resistance thereof, which is measured, e.g. in a bridge circuit. For this purpose the ends of the strain wire connected to the fixed pins are connected via electrical leads to terminals for connection of the strain wire in the measuring bridge. By providing fixed pins to which the strain wires are connected, the distance between such pins and the terminals to which such leads are connected remains fixed, so that these leads can be directly connected to such fixed pins and terminals without having to place slack in such leads. Where the strain wire carrying pins to which the leads are connected are movable, as in certain prior art devices, since the terminals are fixed, it is necessary to take into account change in distance between such movable pins and terminals by placing some slack in the leads. This has the disadvantage of the danger of rupture of the leads connecting the pins and terminals, as result of such movement of the pins with respect to the terminals, and the consequent repeated slackening and tightening of the leads.

In a preferred embodiment, the pins on the flexure member extend on opposite sides of the plane of such flexure member, and a pair of strain wires are connected to the pins on opposite sides of the flexure member, both strain wires being parallel to the plane of the flexible arms. The wire on one side of the flexure changing in tension oppositely to the change in tension in the wire on the other side of the flexure member.

As an additional feature of the invention, stop means are provided adjacent the pins on the flexure member, so that on pivotal motion of these pins a predetermined maximum amount, such pins abut the stop means and are prevented from further pivotal motion. Hence, this provides for a maximum safe strain on the wires and prevents breakage thereof due to overload.

Figure 2:
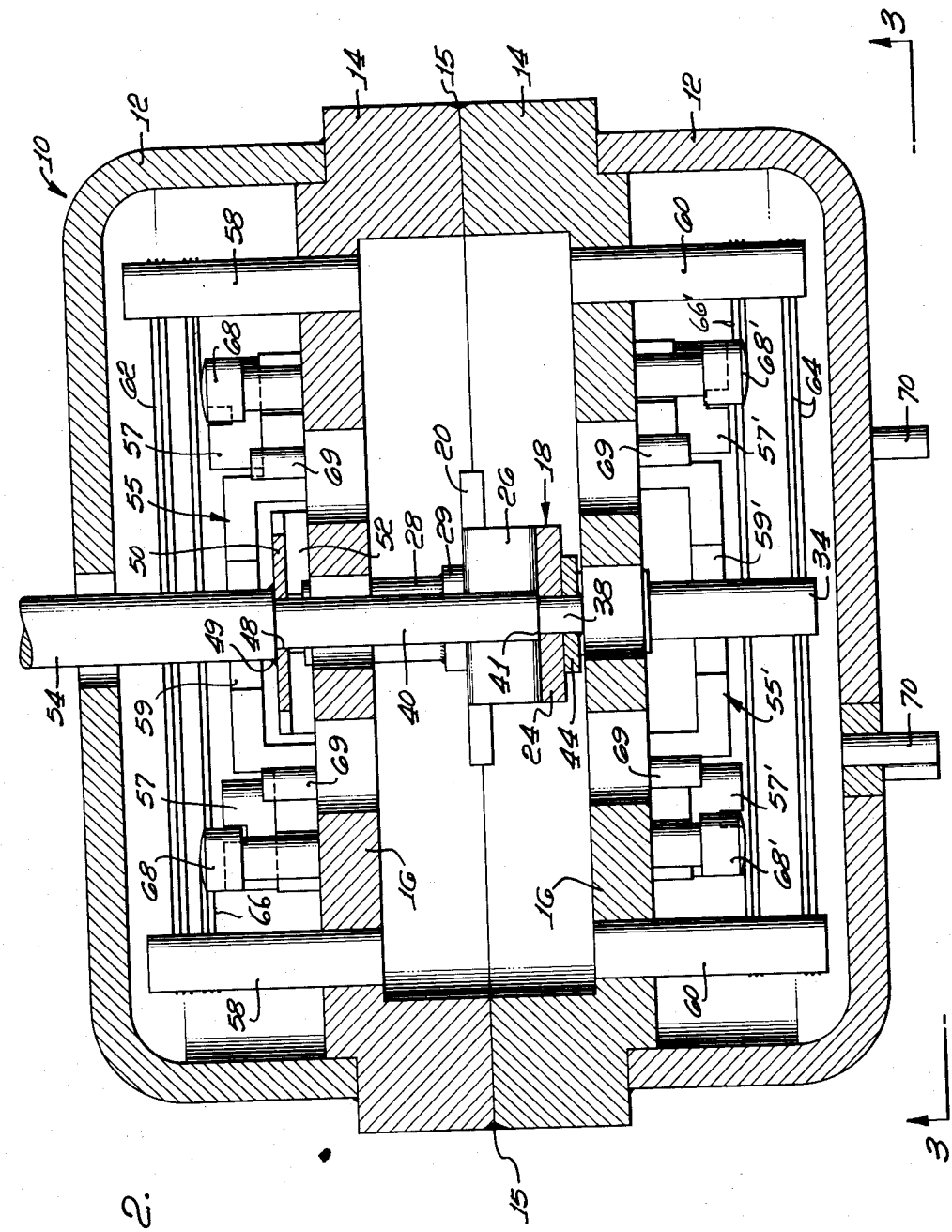

The invention will be more clearly understood by reference to the following description of a preferred embodiment taken in connection with the accompanying drawings wherein:

FIG. 1 is a section through the transducer of the invention;
FIG. 2 is a transverse section taken on line 2—2 of FIG. 1;
FIG. 3 is an end view taken on line 3—3 of FIG. 2;
FIG. 4 is a section taken on line 4—4 of FIG. 1; and
FIG. 5 is a section taken on line 5—5 of FIG. 1.

Referring to the drawings, numeral 10 designates a case formed of two symmetrical half portions 12 each welded at their inner ends at 13 to one of a pair of symmetrical flanges 14, each of said flanges carrying a plate 16 extending across the interior of the case 10, said plates being spaced to form an interior zone 17. The flanges 14 and their integrally connected plates 16 form a frame for my device.

Clamped within adjacent recesses 22 in adjacent faces of the abutting flanges 14 is a flexure member 18 in the form of a flat spring which spans the interior zone 17 between the plates 16. Flexure member 18 comprises a pair of flexible arms 20 which lie in the same plane and a flat offset central portion 24 in a plane parallel to the plane of the flexible arms 20. Arms 20 and the central portion 24 are integrally connected to a pair of inclined portions 26, said portions each being positioned at the same angle to members 20 and at the same angle to member 24. It will be seen that this structure of the flexure member 18 permits displacement thereof up or down in the plane of the paper, viewing FIG. 1, by application of an axial force to the center of the midportion 24, but resists twisting and lateral deformation.

Mounted in apertures 27 of the flexible arms 20 of the flexure member are a pair of like sleeves 28, having collars 29 which rest on said members 20, the sleeves being held against axial movement with respect to the flexure member by welding the sleeves at 30 to the member 18. The sleeves 28 are received within the apertures 36 of plates 16. A pair of insulated pins 32 are mounted within counterbores 33 at one end of each of sleeves 28, and a pair of similar insulated pins 34 are mounted within counterbores 35 at the other ends of sleeves 28.

The reduced end portion 38 of a rod 40 is received within a central aperture 42 of the central portion 24 of flexure member 18, the shoulder 41 of rod 40 abutting member 24. The lower end of the reduced rod end portion 38 carries a plate 44, which is welded at 46 to member 38, the plate 44 abutting the central portion 24 of the flexure member, so that member 24 is clamped between 40 and 44. The rod 40 is thus fixed with respect to the flexure member 18, so that axial motion of the rod 40 causes a flexing or bending of the central portion 24 and the flexible arms 20 of flexure member 18. Rod 40 is connected at its opposite end to a shaft 54, which in turn is attached to a member, e.g. a diaphragm, to which a force or pressure is applied which causes a displacement of the shaft 54. The rod 40 is received at its upper end in an aperture 48 of a cantilever 50, and the base of the shaft 54 is welded at 49 to the cantilever 50. The cantilever 50 is connected at its opposite end to a spacer 52 connected to one of the plates 16. The cantilever 50 supports the rod 40 and shaft 54 for axial displacement thereof, and prevents twisting or lateral displacement of rod 40.

Referring particularly to FIGS. 1, 4, and 5, a pair of U-shaped stop bars 55 are positioned on the surface of one of the plates 16, each of the bars being disposed adjacent a pin 32, said stop bars being attached to the plate by means of the screws 57. The central portion 59 of each of these stop bars is positioned a short distance away from the adjacent pins 32. Likewise, a pair of similar stop bars 55' are positioned on the outer surface of the other plate 16, each of such stop bars being located adjacent one of the pins 34, these stop bars being connected to the other plate 16 by means of the screws 57'. The central portion 59' of the stop bars 55' are also positioned closely adjacent the pins 34.

It will thus be seen that when rod 40 is displaced in one direction, e.g. downwardly viewing FIG. 1, causing the central portion 24 and arms 20 of the flexure member 18 to be bent downwardly, the pins 34 will pivot outwardly and will strike the stop bars 55', after a predetermined maximum pivotal motion of the pins 34. Likewise, when the bar 40 is displaced upward, viewing FIG. 1, this will cause bending of the central portion 24 and arms 20 of the flexure member 18 upwardly, producing a pivotal motion of the other pins 32 outwardly, until at the end of a predetermined amount of such pivotal motion the pins 32 strike the stop bars 55.

Mounted on one of the plates 16, between the pins 32 and aligned diagonally across pins 32 is another pair of fixed pins 58. Also positioned on the other plate 16, between pins 34 and on a line diagonally across pins 34 is another pair of fixed pins 60. Pins 58 are coaxially positioned with respect to pins 60. Pins 58 are on a line perpendicular to the pins 32 and pins 60 are on a line perpendicular to pins 34. The electrical resistance strain wire 62 is mounted on and stretched in tension between all of the pins 32, 58, 32, 58, and an electrical resistance strain wire 64 is likewise mounted on and stretched in tension between pins 34, 60, 34, 60. Each of the strain wires 62 and 64 are wound with multiple loops between the pins. It will be noted that the ends of strain wire 62 are connected via leads 66 from the fixed pins 58 to the terminals 68 on plate 16. Also, the ends of the strain wire 64 are connected by leads 66' from the fixed pins 60 to the terminals 68' on the other plate 16.

Hence, it will be seen that on displacement of the rod 40, e.g. downwardly as viewed in FIG. 1, causing outward pivotal movement of pins 34 and inward pivotal movement of pins 32, the strain wire 64 will be tensioned and the strain wire 62 will be relaxed, causing a proportional change in resistance of these strain wires. Such change in resistance which is proportional to the displacement of rod 40 and the force causing such displacement is measured in a Wheatstone bridge circuit in which the strain wires 62 and 64 are connected in a manner well understood in the art by connection of the proper leads from terminals 68 to the terminals 69 and 70. In a similar manner, when the rod 40 is displaced in an upward direction as viewed in FIG. 1, pins 32 will be pivoted outwardly and pins 34 will be pivoted inwardly, causing an increase in the tension of strain wire 62 and a decrease in the tension of strain wire 64, producing a corresponding change in resistance of these wires which is measured in the bridge circuit.

It will be seen that the stop bars 55 and 55' permit the strain wires 62 and 64 to be tensioned only a limited amount corresponding to the maximum safe tension for these strain wires. Also, it will be noted that since the leads 66 and 66' connecting the ends of the strain wires are each attached at their opposite ends to a fixed pin, e.g. 58, and a fixed terminal, e.g. 68, the leads 66 and 66' can be tensioned initially and no slack need be provided in these leads. In certain prior art devices, as previously mentioned, the leads from the strain wire to the terminals are attached at one end to movable pins, requiring placing of slack in such leads. If desired, the stop bars 55 and 55' can be made adjustable to vary the amount of pivotal motion which can be imparted to the pins 32 and 34 before they strike the central portions 59 and 59' of such stop bars, and hence the amount of overload protection to the strain wires can be adjusted accordingly.

From the foregoing it is seen that I have developed a simplified type of transducer which has certain distinct advantages.

While I have described a particular embodiment of my invention for the purpose of illustration, it should be understood that various modifications and adaptations thereof may be made within the spirit of the invention as set forth in the appended claims.

I claim:

1. A transducer which comprises a frame, a flexible beam member mounted across said frame, said member having a central portion offset from the end portions of said beam member, first wire mounting means connected to opposite end portions of said flexible beam member, second wire mounting means fixedly connected to said frame at points between but disposed outwardly from said first wire mounting means, said first and second wire mounting means being disposed perpendicular to the plane of the end portions of said flexible member, an electrical resistance strain wire stretched in tension between said first wire mounting means and said second wire mounting means, said wire being in a plane substantially parallel to the end portions of said flexible beam member, and a force summing member mounted on said central offset portion for displacement of said flexible beam member to produce pivotal motion of said first wire mounting means toward or away from each other, terminals mounted on said frame and electrical leads connecting the ends of said strain wire and mounted between said second fixed wire mounting means and said terminals.

2. A transducer which comprises a frame, a substantially flat flexible beam member mounted across said frame, said member having a central portion offset from the end portions of said beam member, first wire mounting means connected to opposite end portions of said flexible beam member, second wire mounting means fixedly connected to said frame at points between but disposed outwardly from said first wire mounting means, said first and second wire mounting means being disposed perpendicular to the plane of the end portions of said flexible beam member, an electrical resistance strain wire stretched in tension between said first wire mounting means and said second wire mounting means, said wire being in a plane substantially parallel to the end portions of said flexible beam member, and a force summing member mounted on said central offset portion for displacement of said flexible beam member to produce pivotal motion of said first wire mounting means toward or away from each other, terminals mounted on said frame and electrical leads connecting the ends of said strain wire and mounted between said second fixed wire mounting means and said terminals, and stop means mounted adjacent said first wire mounting means and limiting pivotal motion thereof.

3. A transducer which comprises a frame, a flexible beam member mounted across said frame, said member having a central portion offset from the end portions of said beam member, angularly positioned members connecting said central offset portion and said end portions, first wire mounting means connected to opposite end portions of said flexible beam member, second wire mounting means fixedly connected to said frame at points between but disposed outwardly from said first wire mounting means, said first and second wire mounting means being disposed perpendicular to the plane of the end portions of said flexible member, said first and second wire mounting means extending in opposite directions from the plane of said flexible member, electrical resistance strain wires stretched in tension between said first wire mounting means and said second wire mounting means on opposite sides of said flexible member, said wires being in a plane substantially parallel to the end portions of said flexible member, and a force summing member mounted on said central offset portion for displacement of said flexible member to produce pivotal motion of said first wire mounting means toward or away from each other, terminals mounted on said frame and electrical leads connecting the ends of said strain wire and mounted between said second fixed wire mounting means and said terminals, and stop means mounted adjacent opposite ends of said first wire mounting means, limiting pivotal motion thereof.

4. A transducer which comprises a frame, a flexible flat spring mounted across said frame, and having a pair of flexible arms in a common plane and an offset central portion, said central portion being connected to said flexible arms by an inclined portion forming equal angles with the plane of said flexible arms, the plane of said central portion being parallel to the plane of said flexible arms, a pair of first wire supporting pins mounted adjacent the ends of said arms, a pair of second fixed wire supporting pins mounted on said frame between said first pins, said second pins being aligned transversely of said first pins, a strain wire stretched in tension between said first and second pins, said strain wire being in a plane parallel to the plane of said flexible arms, and a force summing rod axially connected to the central portion of said spring for displacement of said spring to produce pivotal motion of said pins toward or away from each other, terminals mounted on said frame and electrical leads connecting the ends of said strain wire and mounted between said second fixed pins and said terminals.

5. A transducer which comprises a frame, a flexible flat spring mounted across said frame, and having a pair of flexible arms in a common plane and an offset central portion, said central portion being connected to said flexible arms by an inclined portion forming equal angles with the plane of said flexible arms, the plane of said central portion being parallel to the plane of said flexible arms, a pair of first wire supporting pins mounted adjacent the ends of said arms, a pair of second fixed wire supporting pins mounted on said frame between said first pins, each of said first and second pins extending to one side of the plane of said arms, said second pins being aligned transversely of said first pins, a pair of third wire supporting pins mounted adjacent the ends of said arms in axial alignment with said first pins, a pair of fourth fixed wire supporting pins mounted on said frame in axial alignment with said second pins, each of said third and fourth pins extending to the other side of the plane of said flexible arms, a first strain wire stretched in tension between said first and second pins, on one side of the plane of said flexible arms, a second strain wire stretched in tension between said third and fourth pins on the other side of the plane of said flexible arms, said first and second strain wires each being in a plane parallel to the plane of said flexible arms, a force summing rod axially connected to the central portion of said spring for displacement of said spring to produce pivotal motion of said first pins, and of said third pins toward or away from each other, and stop means mounted adjacent each of said first and third pins, limiting pivotal motion thereof, terminals mounted on said frame adjacent each of said second and fourth pins, and electrical leads connecting the ends of said strain wires and mounted between each of said second and fourth pins, and said terminals.

References Cited in the file of this patent

UNITED STATES PATENTS

| | | |
|---|---|---|
| 2,751,476 | Statham | June 19, 1956 |
| 2,886,678 | Curtis | May 12, 1959 |
| 2,918,641 | Di Giovanni | Dec. 22, 1959 |